US012167436B2

(12) United States Patent
Mao et al.

(10) Patent No.: US 12,167,436 B2
(45) Date of Patent: Dec. 10, 2024

(54) USER SELECTION FOR MU-MIMO COMMUNICATIONS

(71) Applicant: NOKIA SOLUTIONS AND NETWORKS OY, Espoo (FI)

(72) Inventors: Weiqiang Mao, Zhejiang (CN); Lijun Wang, Zhejiang (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 479 days.

(21) Appl. No.: 17/634,730

(22) PCT Filed: Aug. 14, 2019

(86) PCT No.: PCT/CN2019/100648
§ 371 (c)(1),
(2) Date: Feb. 11, 2022

(87) PCT Pub. No.: WO2021/026833
PCT Pub. Date: Feb. 18, 2021

(65) Prior Publication Data
US 2022/0279533 A1    Sep. 1, 2022

(51) Int. Cl.
*H04W 72/542* (2023.01)
*H04B 7/0452* (2017.01)
*H04B 7/0456* (2017.01)
*H04L 25/02* (2006.01)

(52) U.S. Cl.
CPC ........ *H04W 72/542* (2023.01); *H04B 7/0452* (2013.01); *H04B 7/0456* (2013.01); *H04L 25/021* (2013.01)

(58) Field of Classification Search
CPC . H04W 72/542; H04B 7/0452; H04B 7/0456; H04L 25/021; H04L 25/0204;
(Continued)

(56) References Cited

U.S. PATENT DOCUMENTS

| 2011/0194593 A1 | 8/2011 | Geirhofer et al. |
| 2015/0092556 A1 | 4/2015 | Prasad et al. |
| 2017/0181183 A1* | 6/2017 | Sung ............... H04B 7/063 |

FOREIGN PATENT DOCUMENTS

| CN | 105554899 A | 5/2016 |
| CN | 107465436 A | 12/2017 |

(Continued)

OTHER PUBLICATIONS

Extended European Search Report dated Mar. 14, 2023, corresponding to European Patent Application No. 19941532.4.
(Continued)

*Primary Examiner* — Mandish K Randhawa
(74) *Attorney, Agent, or Firm* — SQUIRE PATTON BOGGS (US) LLP

(57) ABSTRACT

Embodiments of the present disclosure relate to a method, an apparatus and a computer readable storage medium of user selection for MU-MIMO communications. In example embodiments, a method is provided. The method comprises determining a set of candidate terminal devices; and iteratively performing the following at least once until an end condition is met: generating, based on respective channel estimations for the set of candidate terminal devices, a covariance matrix indicating interdependency among the set of candidate terminal devices; determining a minimum eigenvalue of the covariance matrix and an eigenvector corresponding to the minimum eigenvalue, the eigenvector indicating a set of measurements for interdependency among the set of candidate terminal devices; and updating the set of candidate terminal devices by removing, from the set of candidate terminal devices, a candidate terminal device associated with a maximum measurement in the set of measurements.

19 Claims, 5 Drawing Sheets

(58) Field of Classification Search
CPC ............. H04L 25/0248; H04L 25/0254; H04L 25/0258
See application file for complete search history.

(56) References Cited

FOREIGN PATENT DOCUMENTS

| | | |
|---|---|---|
| EP | 3322103 A1 | 5/2018 |
| WO | 2019100332 A1 | 5/2019 |

OTHER PUBLICATIONS

Maciel-Barboza Fermin Marcelo et al: "User Selection Algorithms for MU-MIMO Systems with Coordinated Beamforming", XP055780833.
Shikida Jun et al: "Performance analysis of low complexity multi-user MIMO scheduling schemes for massive MIMO system", XP032975434.
International Search Report and Written Opinion dated May 12, 2020 corresponding to International Patent Application No. PCT/CN2019/100648.
Fermin Marcelo Maciel Barboza et al., "User Selection Algorithms for MU-MIMO Systems with Coordinated Beamforming," ETRI Journal, vol. 38, No. 1, Feb. 1, 2016.
Bu hong Wang et al., "Maximum Volume Criterion for User Selection of Multiuser MIMO Downlink with Multiantenna Users and Block Diagonalization Beamforming," 2010 IEEE Antennas and Propagation Society International Symposium, Sep. 2, 2010, pp. 1-3.

\* cited by examiner

USER SELECTION FOR MU-MIMO COMMUNICATIONS

TECHNICAL FIELD

Embodiments of the present disclosure generally relate to the field of telecommunications, and in particular, to a method, an apparatus and a computer readable medium of user selection for multi-user multiple input multiple output (MU-MIMO) communications.

BACKGROUND

In a MIMO or massive MIMO communication system, one of the most attractive functions is the usage of spatial multiplexing to improve system capacity. This function is called MU-MIMO. MU-MIMO supports scheduling of multiple users by using same frequency resources at the same time.

In MU-MIMO communications, one of the key problems is user selection, which is also referred to as user pairing. User selection means selecting, from a set of candidate users, a number of users to be scheduled in the next round so as to reach the expected performance, for example, to maximize the system capacity.

SUMMARY

In general, example embodiments of the present disclosure provide a method, an apparatus and a computer readable storage medium of user selection for MU-MIMO communications.

In a first aspect, there is provided an apparatus. The apparatus comprises at least one processor; and at least one memory including computer program codes; the at least one memory and the computer program codes are configured to, with the at least one processor, cause the apparatus to determine a set of candidate terminal devices; and iteratively perform the following at least once until an end condition is met: generating, based on respective channel estimations for the set of candidate terminal devices, a covariance matrix indicating interdependency among the set of candidate terminal devices; determining a minimum eigenvalue of the covariance matrix and an eigenvector corresponding to the minimum eigenvalue, the eigenvector indicating a set of measurements for interdependency among the set of candidate terminal devices; and updating the set of candidate terminal devices by removing, from the set of candidate terminal devices, a candidate terminal device associated with a maximum measurement in the set of measurements.

In a second aspect, there is provided a method. The method comprises determining a set of candidate terminal devices; and iteratively performing the following at least once until an end condition is met: generating, based on respective channel estimations for the set of candidate terminal devices, a covariance matrix indicating interdependency among the set of candidate terminal devices; determining a minimum eigenvalue of the covariance matrix and an eigenvector corresponding to the minimum eigenvalue, the eigenvector indicating a set of measurements for interdependency among the set of candidate terminal devices; and updating the set of candidate terminal devices by removing, from the set of candidate terminal devices, a candidate terminal device associated with a maximum measurement in the set of measurements.

In a third aspect, there is provided an apparatus. The apparatus comprises means for determining a set of candidate terminal devices; and means for iteratively performing the following at least once until an end condition is met: generating, based on respective channel estimations for the set of candidate terminal devices, a covariance matrix indicating interdependency among the set of candidate terminal devices; determining a minimum eigenvalue of the covariance matrix and an eigenvector corresponding to the minimum eigenvalue, the eigenvector indicating a set of measurements for interdependency among the set of candidate terminal devices; and updating the set of candidate terminal devices by removing, from the set of candidate terminal devices, a candidate terminal device associated with a maximum measurement in the set of measurements.

In a fourth aspect, there is a computer readable storage medium comprising program instructions stored thereon. The instructions, when executed by an apparatus, cause the apparatus to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
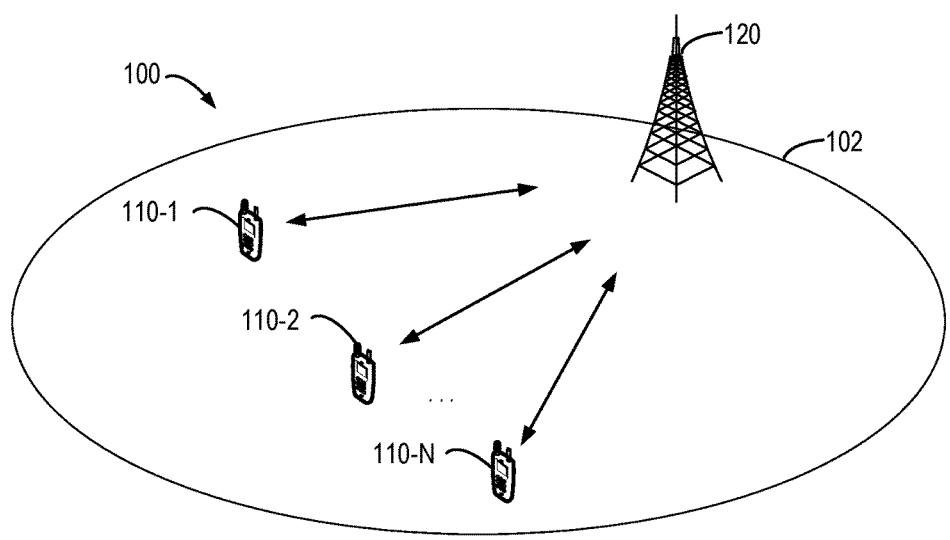
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which implementations of the present disclosure can be implemented. The communication network 100 includes a network device 120 and terminal devices 110-1, 110-2 . . . and 110-N, which can be collectively referred to as "terminal device(s)" 110. The network 100 can provide one or more cells 102 to serve the terminal devices 110. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In some embodiments, the network device 120 may serve terminal devices, e.g., the terminal devices 110 in FIG. 1, with a plurality of antennas. For example, the network device 120 may be equipped with a plurality of transmitting antennas, and/or a plurality of receiving antennas. Likewise, in some embodiments, some or all of the terminal devices 110 may be equipped with a plurality of antennas for transmitting and/or receiving. In addition, some or all of the terminal devices 110 may be scheduled to transmit or receive in the same or overlapped frequency resources at the same time, thereby forming a MU-MIMO communication. Therefore, there is a need to select, from a set of candidate terminal devices (which are also referred to candidate users herein), a plurality of terminal devices (which are also referred to users herein) to be scheduled in the next round, so as to reach the expected performance, for example, to maximize the system capacity.

Implementations of the present disclosure relate to user selection for MU-MIMO communications. The MU-MIMO communications may include downlink (DL) MU-MIMO communications and uplink (UL) MU-MIMO communications. The UL MU-MIMO communications differ from the DL MU-MIMO communications in the description of transmitting and receiving antennas. For an UL MU-MIMO user selection problem, it can be transferred to a DL MU-MIMO user selection problem by constructing a DL channel estimation matrix for candidate users as the transpose of an UL channel estimation matrix. Therefore, in the following, DL MU-MIMO communications will be described only for the purpose of illustration and help those skilled in the art to understand idea and principle of the present disclosure, without suggesting any limitations as to the scope of the disclosure. The user selection solution of the present disclosure can be applicable to UL MU-MIMO communications and DL MU-MIMO communications.

In general, in a MU-MIMO system, a channel model for a user k in a set of candidate users may be expressed as Equation (1):

$$y_k = D_k^H H_k \Sigma_{i=1}^K M_k x_k + z_k \quad (1)$$

where:
- Nt represents the number of transmitting antennas in a network device;
- K represents the number of active users in the cell of interest and focuses on data transmission on a resource block in each scheduling interval;
- $Nr_k$ represents the number of receiving antennas of user k among candidate users;
- Nr represents the total number of receiving antennas of all candidate users, where $Nr = \Sigma_{k=1}^K Nr_k$;
- $S_k$ represents the number of streams for user k, where $S_k \leq Nr_k$;
- S represents the total number of streams for all candidate users, $S = SUM(S_k)$, where $S \leq Nt$;
- $x_k$ represents a transmitted symbol vector for user k and its size is ($S_k$, 1) (i.e., $S_k$ rows and one column);
- $M_k$ represents a precoding matrix for user k, its column vectors are orthogonal with one another and each of the column vectors has a unit length, and its size is (Nt, $S_k$);
- $H_k$ represents a channel estimation matrix for user k, and its size is ($Nr_k$, Nt);
- $D_k$ represents a receiving beamforming vector for user k, its size is ($Nr_k$, $S_k$), and the superscript H means conjugate transpose operation to matrix $D_k$;
- $y_k$ represents a received signal vector in user k after beam-forming, and its size is ($S_k$,1); and
- $z_k$ represents additive normal distribution noise, and its size is ($S_k$,1).

It is assumed that y represents a received signal matrix for all candidate users:

$$y = \begin{pmatrix} y_1 \\ y_2 \\ \vdots \\ y_K \end{pmatrix} \quad (2)$$

where y has a size of (S,1). It is also assumed that:

$$\hat{H}_k = D_k^H H_k \quad (3)$$

where $\hat{H}_k$ has a size of ($S_k$, Nt). $\hat{H}$ may be defined as following:

$$\hat{H} = \begin{pmatrix} \hat{H}_1 \\ \hat{H}_2 \\ \vdots \\ \hat{H}_K \end{pmatrix} \quad (4)$$

where $\hat{H}$ has a size of (S, Nt), and represents channel estimation with a receiving beam-forming matrix. It is assumed that x represents a transmitted signal matrix for all candidate users:

$$x = \begin{pmatrix} x_1 \\ x_2 \\ \vdots \\ x_K \end{pmatrix} \quad (5)$$

where x has a size of (S, 1). It is also assumed that M represents a transmitting pre-coding matrix:

$$M=(M_1 \, M_2 \ldots M_K) \quad (6)$$

where M has a size of (Nt, S). Thus, for all candidate users, the received signal matrix y can be written as:

$$y=\hat{H}Mx+z \quad (7)$$

In Equation (7), it is assumed that each user has only one stream. For a user having multiple streams, this user can be considered as multiple virtual users, each of which has only one stream. Thus, there are total S users, each of which has one stream, where S≤Nt.

Embodiments of the present disclosure relates to selecting uNum users or less than uNum users from S candidate users for the next round MU-MIMO scheduling (where uNum ≲ Nt) so as to maximize the system capacity with the constraint of transmitting power.

In the following, only for the purpose of simplicity, equal power allocation for the users will be considered since the power allocation solution is not key issue for user selection. It is to be understood that embodiments of the present disclosure can also be applicable to other power allocation solutions, for example, water filling based power allocation solution, and so on.

Currently, a zero forcing (ZF) greedy algorithm for MU-MIMO user selection has been proposed. According to the ZF greedy algorithm, one user is selected firstly, then one more user is added to the selected user set in each iteration, until the required uNum users are selected or the maximum capacity is achieved. In each iteration of the ZF greedy algorithm, it is needed to check all of the left users one by one to find the best one. Computer instructions for the ZF greedy algorithm may be constructed as following:

ZF Greedy Algorithm
Input:
    Candidate user set: U
    Channel matrix: H
    Maximum selected user number: uNum
Initialization:
    Set k=1
    Find a user $w_1$, such that $w_1 = \mathrm{argmax}_{u \in U}(H_u H_u^H)$
    Set $W_1=\{w_1\}$, and denote the achieved rate as $R_{zf}(W_1)$.
While k<uNum:
    Increase k by 1
    Find a user, $w_k$, such that $w_k = \mathrm{argmax}_{u \in U \setminus W_{k-1}} R_{zf}(W_{k-1} \cup \{u\})$
    Set $W_k = W_{k-1} \cup \{w_k\}$, and denote the achieved rate as $R_{zf}(W_k)$
    If $R_{zf}(W_k) \leq R_{zf}(W_{k-1})$ break, and return $W_{k-1}$ as the selected user set
End of ZF Greedy Algorithm In the above ZF greedy algorithm, $H_u$ represents a row vector for user u. The channel capacity for user $w_k$ may be expressed as:

$$R_{zf}(w_k)=\log_2(1+p_{w_k}*c_k(H_W)) \quad (8)$$

where $H_W$ represents the channel matrix constructed by the user set W, and:

$$c_k(H_W) = \left\{\left[(H_W H_W^H)^{-1}\right]_{k,k}\right\}^{-1} \quad (9)$$

If $(H_W H_W^H)$ cannot be inverted, then $c_k(H_W)=0$. Power is equally allocated among all of the users:

$$p_{w_k}=P/len(W) \quad (10)$$

where P represents the total power, and len(W) represents the number of users in the user set W. The total channel capacity for the user set W is determined as:

$$R_{zf}(W)=\Sigma_{w \in W} R_{zf}(w) \quad (11)$$

It can be seen that the ZF greedy algorithm has a computing complexity of $O(SNt^3)$.

The complexity of $O(SNt^3)$ will make it difficult to use the ZF greedy algorithm in real mMIMO products, especially when the number Nt of the transmitting antennas in 5G gNodeB is very great.

Embodiments of the present disclosure propose a solution of user selection for MU-MIMO communications. According to embodiments of the present disclosure, the MU-MIMO user selection problem can be considered as a problem to measure users' interdependency based on their channel estimations. For example, the interdependency measurements of the users can be abstracted as the following problem:

$$\rho = \mathrm{argmin}_u \|H^H u\|^2 \text{ subject to } \|u\|^2=1 \quad (12)$$

where each row in the matrix H means a corresponding channel estimation of one user. ρ represents the interdependency measurements of the users. For one user, a corresponding element value in ρ means dependency of the user with other users. Equation (12) can also be written as:

$$\rho = \mathrm{argmin}_u \frac{u^H H H^H u}{u^H u} \quad (13)$$

According to the eigenvalue theory, it is known that ρ in Equation (13) is the eigenvector corresponding to the minimum eigenvalue of the covariance matrix $HH^H$. After the interdependency measurements of the users are determined, a greedy algorithm can be used for MU-MIMO user selection.

According to embodiments of the present disclosure, a set of candidate users can be determined initially. A covariance matrix is generated based on respective channel estimations for the set of candidate users. A minimum eigenvalue of the covariance matrix and an eigenvector corresponding to the minimum eigenvalue are determined based on an optimized batch gradient descent (BGD) algorithm. The eigenvector indicates a set of measurements for interdependency among the set of candidate users. The set of candidate users are updated by removing a candidate user associated with a maximum measurement in the set of measurements. The updating of the set of candidate users can be performed iteratively more than once until the number of candidate terminal devices is below a threshold number and the minimum eigenvalue meets an exit criterion. In this way, embodiments of the present disclosure can achieve lower computing complexity than the legacy user selection algorithms, while achieve same or similar system capacity.

Figure 2:
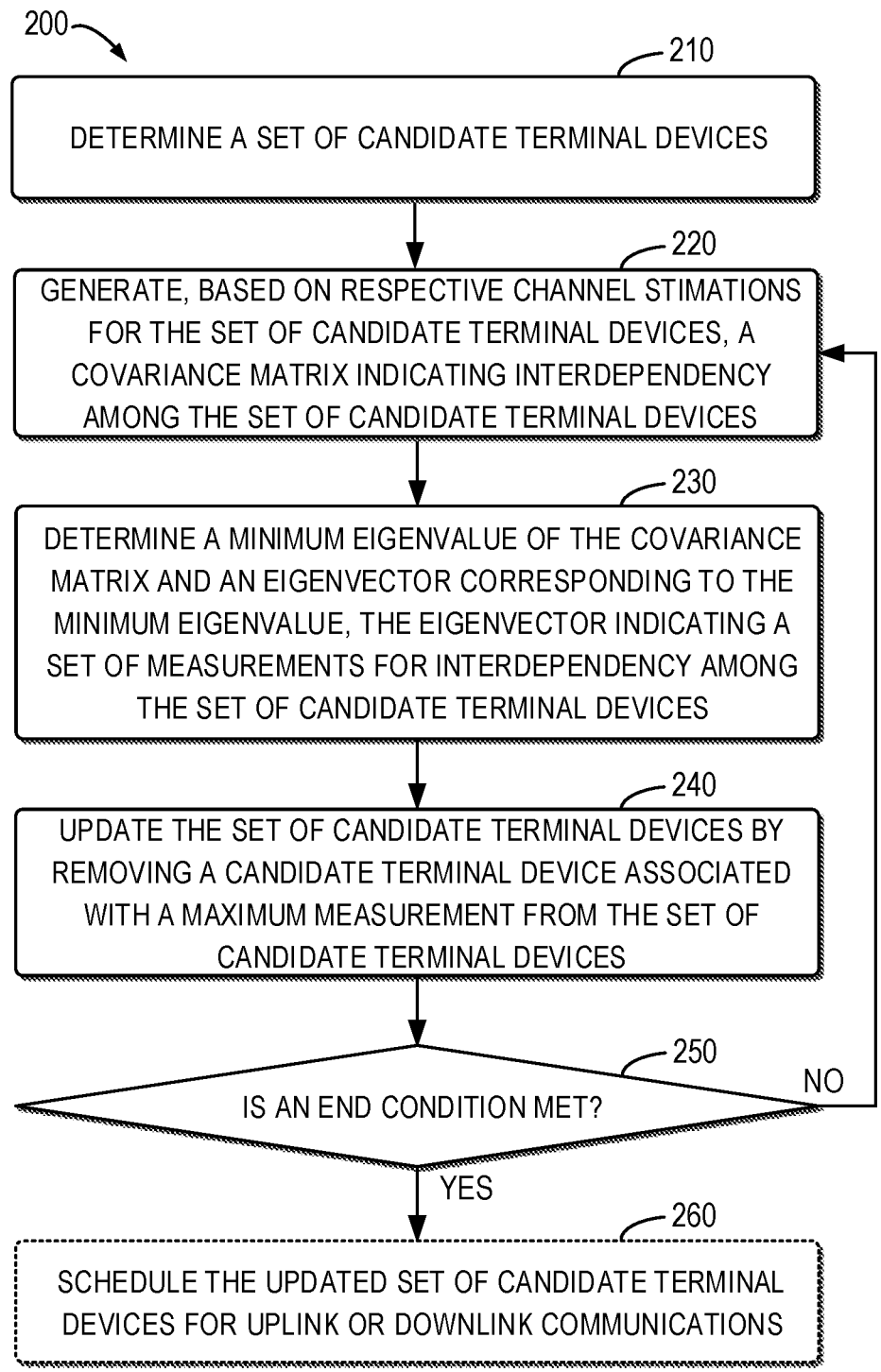
FIG. 2 shows a flowchart of a method of user selection in accordance with some example embodiments of the present disclosure.

FIG. 2 shows a flowchart of a method 200 of user selection in accordance with some example embodiments of the present disclosure. The method 200 can be implemented at the network device 120 as shown in FIG. 1. It is to be understood that the method 200 may include additional blocks not shown and/or may omit some shown blocks, and the scope of the present disclosure is not limited in this regard.

At block 210, the network device 120 determines a set of candidate terminal devices. In some example embodiments, for example, the network device 120 may select all of terminal devices to be scheduled for UL or DL communications into the set of candidate terminal devices.

At block 220, the network device 120 generates, based on respective channel estimations for the set of candidate terminal devices, a covariance matrix indicating interdependency among the set of candidate terminal devices.

In some example embodiments, the network device 120 may generate a channel estimation matrix H based on respective channel estimations for the set of candidate terminal devices, where each row of the channel estimation matrix H indicates a corresponding channel estimation for one of the set of candidate terminal devices. Then, the network device 120 may generate a covariance matrix P based on the channel estimation matrix H, where P=HH$^H$. The covariance matrix P indicates interdependency among the set of candidate terminal devices. Alternatively, in some example embodiments, the network device 120 may generate a channel estimation matrix H based on respective channel estimations for the set of candidate terminal devices, where each column of the channel estimation matrix H indicates a corresponding channel estimation for one of the set of candidate terminal devices. Then, the network device 120 may generate a covariance matrix P based on the channel estimation matrix H, where P=H$^H$H. In the following, it is assumed that each row of the matrix H indicates a channel estimation for a candidate terminal device and the covariance matrix P is determined as HH$^H$. It is to be understood that this is merely for the purpose of illustration, without suggesting any limitation to the scope of the present disclosure.

At block 230, the network device 120 determines a minimum eigenvalue of the covariance matrix P and an eigenvector corresponding to the minimum eigenvalue. The eigenvector indicates a set of interdependency measurements of the set of candidate terminal devices.

There are a lot of methods for determining the minimum eigenvalue and its corresponding eigenvector. One of the methods is called eigenvalue decomposition (EVD):

$$EVD(P)=U\Sigma U^H \quad (14)$$

where the last column of the matrix U is the eigenvector corresponding to the minimum eigenvalue. The main problem of EVD is its high computing complexity.

In some example embodiments, an optimized BGD algorithm can be used to approximate the minimum eigenvalue and its corresponding eigenvector. The optimized BGD algorithm is a Recurrent Neural Network (RNN) based algorithm, which can be easily implemented in different hardware, such as, central processing unit (CPU), digital signal processor (DSP), graphics processing unit (GPU), Field Programmable Gate Array (FPGA), and so on. The key target of the optimized BGD algorithm is to solve the following linear problem:

$$y=Hx+z \quad (15)$$

x can be obtained by minimizing the following target function:

$$\mathrm{argmin}_x \|y-Hx\|^2 \quad (16)$$

The minimum eigenvalue and its corresponding eigenvector can be determined by the optimized BGD algorithm with y=0, z=0 and a transposed conjugated H. The optimized BGD algorithm will be described with reference to FIG. 3.

Figure 3:
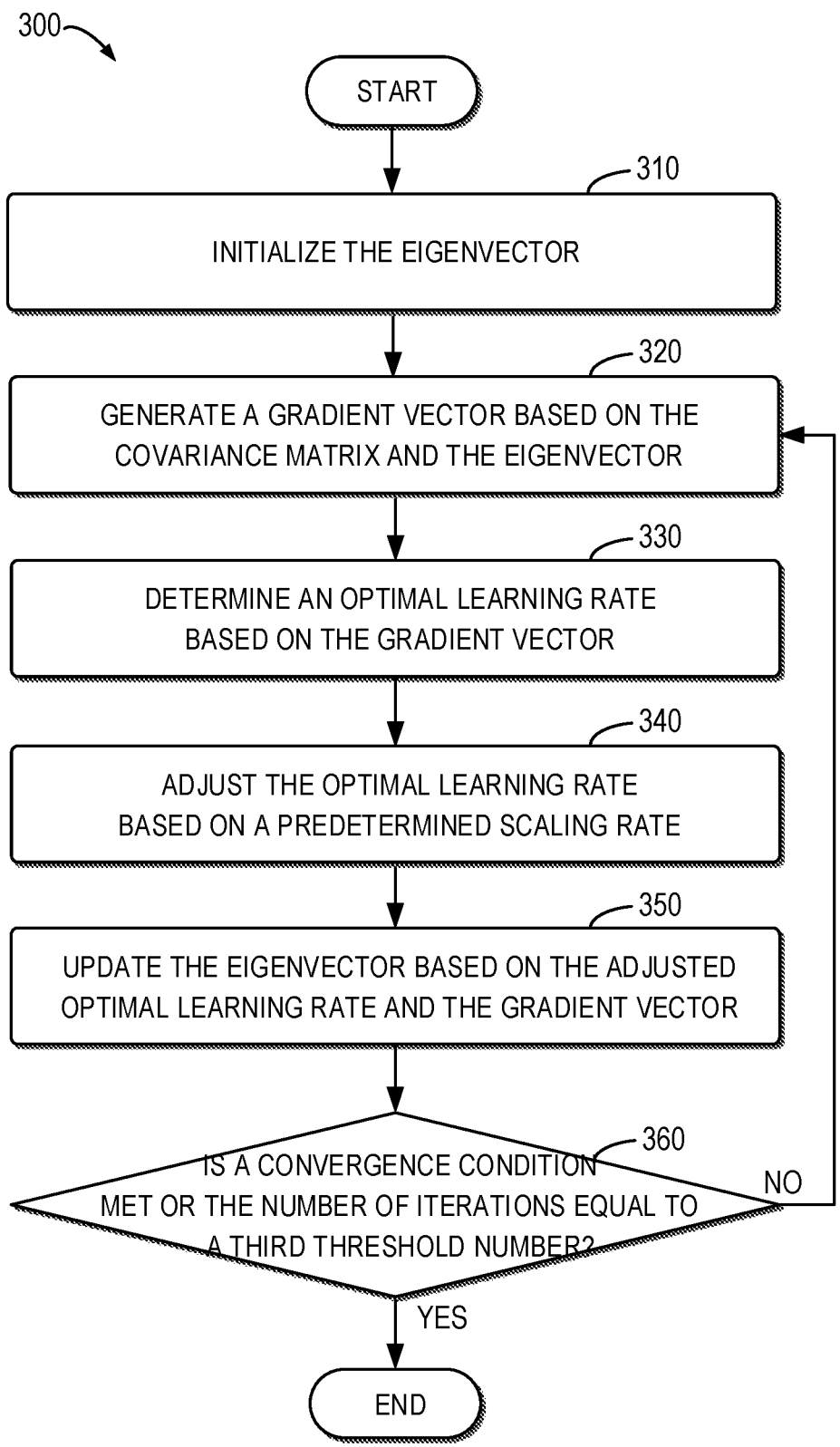
FIG. 3 shows a flowchart of a method for determining a minimum eigenvalue of the covariance matrix and an eigenvector corresponding to the minimum eigenvalue in accordance with some example embodiments of the present disclosure.

FIG. 3 shows a flowchart of a method 300 for determining the minimum eigenvalue and its corresponding eigenvector in accordance with some example embodiments of the present disclosure. For example, the method 300 can be considered as an example implementation of block 230 in FIG. 2. It is to be understood that the method 300 may include additional blocks not shown and/or may omit some shown blocks, and the scope of the present disclosure is not limited in this regard.

At block 310, the eigenvector x is initialized. In some example embodiments, the initialized eigenvector x may have a size of (S, 1), where S represents the current user number in the set of candidate terminal devices. In some example embodiments, the initial value of the eigenvector x can be randomly generated. Alternatively, the initial value of the eigenvector x can be 1/$\sqrt{S}$, where 1 is a vector of size (S, 1) and each of elements in 1 is 1.

At block 320, a gradient vector is generated based on the covariance matrix P (that is, HH$^H$) and the eigenvector x. For example, the gradient vector can be generated as following:

$$g=HH^Hx \quad (17)$$

At block 330, an optimal learning rate is determined based on the gradient vector. In some example embodiments, an optimal solution of (x+ηg) can be found, where η is the optimal learning rate. For example, by putting (x+ηg) into Equation (13), Equation (13) can be written as:

$$\rho(\eta) = \mathrm{argmin}_\eta \frac{(x+\eta g)^H HH^H (x+\eta g)}{(x+\eta g)^H (x+\eta g)} \quad (18)$$

By deducing $$\frac{\partial \left( \frac{(x+\eta g)^H HH^H (x+\eta g)}{(x+\eta g)^H (x+\eta g)} \right)}{\partial \eta} = 0,$$

η can be determined as the solution of equation ax$^2$+bx+c=0, where:

$$\begin{cases} a = g^H Pg * x^H g - (g^H g)^2 \\ b = g^H Pg * x^H x - x^H g * g^H g \\ c = g^H g * x^H x - (x^H g)^2 \end{cases} \quad (19)$$

and where P=HH$^H$. Then, the optimal learning rate can be determined as:

$$lrate = \frac{-b + \sqrt{b^2 - 4ac}}{2a} \quad (20)$$

In some example embodiments, in order to further reduce the computing complexity, the optimal learning rate Irate in Equation (20) can be approximated as:

$$Irate = \frac{-c}{b} \quad (21)$$

At block 340, the optimal learning rate is adjusted based on a predetermined scaling rate. In some example embodiments, the optimal learning rate can be adjusted as $$Irate' = \frac{Irate}{srate},$$

where srate represents the predetermined scaling rate. In some example embodiments, the scaling rate for scaling the optimal learning rate may be set for supporting quick convergence. For example, the scaling rate may be set to 1.1. Alternatively, in some example embodiments, the scaling rate may be set to 1. That is, the optimal learning rate may not be adjusted.

At block 350, the eigenvector x is updated based on the adjusted optimal learning rate and the gradient vector g. In some example embodiments, the eigenvector x can be updated as:

$$x = \frac{x + \frac{Irate}{srate} * g}{\left\| x + \frac{Irate}{srate} * g \right\|} \quad (22)$$

At block 360, it is determined if a convergence condition is met or if the number of iterations reaches a threshold number (also referred to as "third threshold number"). In some example embodiments, the convergence condition may be represented as:

$$\|Px - (x^H Px)x\|^2 < end\_threshold \quad (23)$$

where $P = HH^H$ and end_threshold may be defined as a small value to control the accuracy. For example, end_threshold can be defined as any of $10^{-2}$, $10^{-3}$, $10^{-4}$, $10^{-8}$ and so on. If the convergence condition is met or if the number of iterations reaches the third threshold number, the updated eigenvector x can be determined as the eigenvector corresponding to the minimum eigenvalue of the covariance matrix P. Otherwise, the method 300 proceeds to block 320.

Once the eigenvector x corresponding to the minimum eigenvalue of the covariance matrix P (that is, $HH^H$) is determined, the minimum eigenvalue can be determined as: $\lambda = x^H HH^H x$.

With reference back to FIG. 2, the method 200 proceeds to block 240, where the set of candidate terminal devices is updated by removing a candidate terminal device associated with a maximum interdependency measurement from the set of candidate terminal devices. In some example embodiments, a candidate terminal device associated with the biggest element value in the eigenvector corresponding to the minimum eigenvalue can be removed from the set of candidate terminal devices.

At block 250, it is determined whether an end condition is met. In some example embodiments, the end condition may comprise at least one of the following: the number of the candidate terminal devices being below a threshold number (also referred to as "first threshold number"); the minimum eigenvalue meeting an exit criterion; and the number of iterations reaches a threshold number (also referred to as "second threshold number"). In particular, in some example embodiments, the end condition may be the number of the candidate terminal devices being below the first threshold number and the minimum eigenvalue meeting the exit criterion.

In some example embodiments, the exit criterion may be determined based on a coefficient for controlling the number of the candidate terminal devices, a trace of the covariance matrix and total power allocated to the candidate terminal devices. For example, the exit criterion may be represented as:

$$C(\lambda): \lambda > \beta(1 - \log_{10} e)\left(\frac{\|H\|_F^2}{Power}\right)^{\log_{10} e} \quad (24)$$

where $\lambda$ represents the minimum eigenvalue of the covariance matrix $HH^H$. Power represents the total power allocated to the candidate terminal devices. $\|H\|_F^2$ represents Frobenius norm of the matrix H, which represents the trace of the covariance matrix $HH^H$. $\beta$ may be used to control the number of selected users, where a bigger $\beta$ means less users will be selected. For example, $\beta = 1$. e is a natural constant.

Alternatively, in some example embodiments, the exit criterion may be determined based on a coefficient for controlling the number of the candidate terminal devices, the number of the candidate terminal devices, a trace of the covariance matrix and total power allocated to the candidate terminal devices. For example, the exit criterion may be represented as:

$$C(\lambda): \lambda > \beta \frac{\left(\frac{\|H\|_F^2}{S}\right)^{(1-\log_{10} e)}}{Power^{\log_{10} e}} \quad (25)$$

where $\lambda$ represents the minimum eigenvalue of the covariance matrix $HH^H$. Power represents the total power allocated to the candidate terminal devices. S represents the number of the candidate terminal devices. $\|H\|_F^2$ represents Frobenius norm of the matrix H, which represents the trace of the covariance matrix $HH^H$. $\beta$ may be used to control the number of selected users, where a bigger $\beta$ means less users will be selected. For example, $\beta = 1$. e is a natural constant.

In some example embodiments, if the end condition is met, the method 200 proceeds to block 260, where the updated set of candidate terminal devices are scheduled for UL or DL communications. Otherwise, for example, if the number of the candidate terminal devices exceeds the first threshold number or if the minimum eigenvalue fails to meet the exit criterion, it means that extra candidate terminal devices should be removed from the candidate user set. In this event, the method 200 proceeds to block 220.

As an example rather than limitation, computer instructions for implementing the user selection in accordance with embodiments of the present disclosure can be constructed as following:

Eigen-Based Greedy Algorithm
Input:
    Channel estimation matrix: H, which has a size of (S, Nt)
    Maximum selected user number: uNum, where uNum $\leqslant$ S and S is the total candidate user number
Initialization:
    Set an initial user set W: it includes all candidate users, so len(W)=S Eigen-Based Greedy Algorithm Main Routine:

While len(W)>1:

Construct a matrix H, each row of H is the channel estimation of one user in W

Calculate the minimum eigenvalue A and the corresponding eigenvector x of $HH^H$ If len(W)≤ uNum and C(λ) in Equation (24) or (25) is True: break Find the user index k which has the maximum absolute value in minimum eigenvector: $k=\mathrm{argmax}_k(\|x_k\|)$ Update the user set W: W=W\{the k-th user}

Output: W

End of Eigen-Based Greedy Algorithm

Figure 4A:
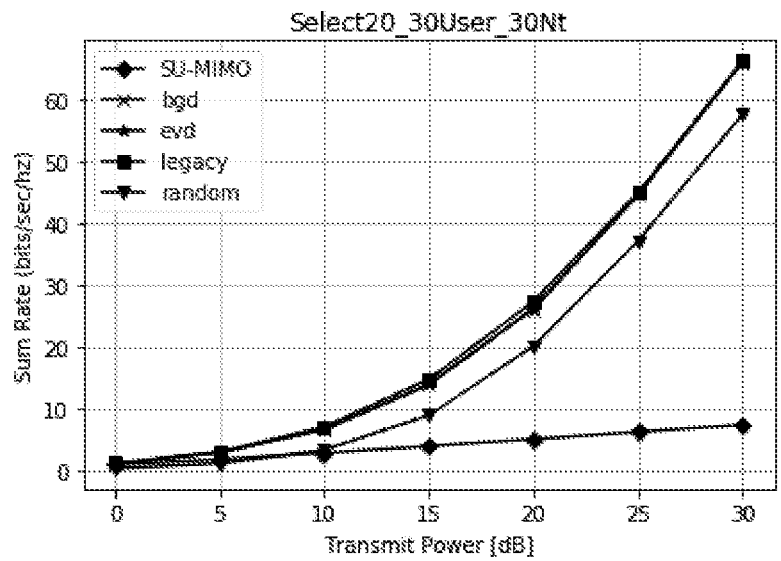
FIGS. 4A-4B are diagrams illustrating performance comparison among different user selection schemes.
Figure 4B:
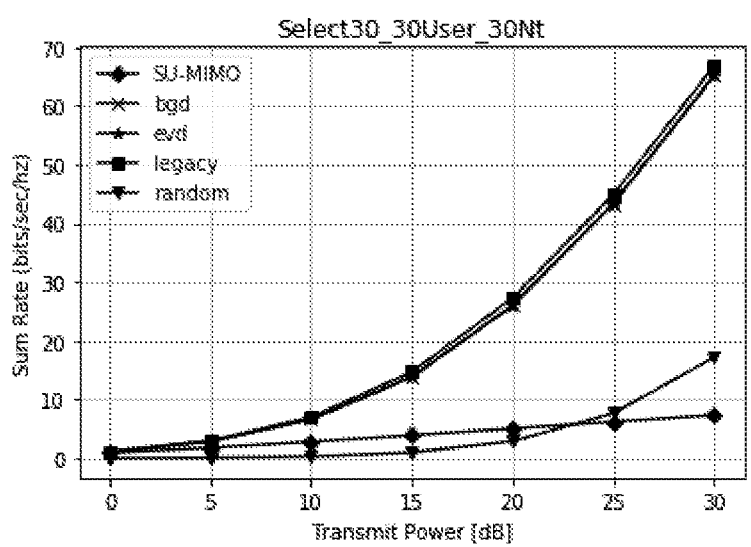

FIGS. 4A-4B are diagrams illustrating performance comparison among different user selection schemes. In FIGS. 4A-4B, it is assumed that elements in the matrix H are generated based on a normal distribution N(0, 1)/sqrt(Nt) and the elements in the matrix H are real values. Tested SNR values are [0, 5, 10, 15, 20, 25, 30] dB, where 20000 sample data for each SNR is simulated. With respect to the optimized BGD algorithm, the total iteration number (that is, the third threshold number) is set to 150; the initial value of the eigenvector x is set to $1/\sqrt{S}$, where 1 is an all-one vector of size (S, 1) and S represents the number of candidate users; end_threshold is set to $10^{-8}$; the scaling rate srate is set to 1.1; and the coefficient β is set to 1. Only for the purpose of simplicity, it is assumed that transmit beam-forming is based on ZF, then the capacity comparing is based on Equation (11). It is to be understood that other type of beam-forming can be used too, but the capacity equation needs to be changed accordingly.

In FIGS. 4A-4B, the eigen-based greedy algorithms and ZF based greedy algorithm (denoted as "legacy" in FIGS. 4A-4B) are compared. For the eigen-based greedy algorithms, both EVD (denoted as "evd" in FIGS. 4A-4B) and optimized BGD (denoted as "bgd" in FIGS. 4A-4B) algorithms are compared. The greedy algorithms are also compared with MU-MIMO random selection method (denoted as "random" in FIGS. 4A-4B) and single-user multiple input multiple output (denoted as "SU-MIMO" in FIGS. 4A-4B), where the MU-MIMO random selection method means users are selected randomly and SU-MIMO means only select one user which has the biggest space gain.

FIG. 4A shows performance comparison in such a case, where S=30, Nt=30 and the number of selected users uNum=20. This is the case to simulate a situation that the system can only support a limited number of co-scheduled users. It can be seen from FIG. 4A that the eigen-based greedy algorithm can achieve almost the same capacity as the legacy ZF based greedy algorithm. There is no big difference between the EVD based algorithm and the optimized BGD based algorithm.

FIG. 4B shows performance comparison in another case, where S=30, Nt=30 and the number of selected users uNum=30. This is the case to simulate a situation that as many users as possible are selected, so as to maximize system capacity. It can be seen from FIG. 4B that the eigen-based greedy algorithm can achieve very close capacity as the legacy ZF based greedy algorithm. There is no big difference between the EVD based algorithm and the optimized BGD based algorithm. In this special case, it can be seen that the random selection method does not work anymore.

In view of the above, it can be seen that according to embodiments of the present disclosure, the eigen-based greedy algorithm can be used for both DL and UL MU-MIMO user selection, which proposes a universal method for measuring interdependency among users. The eigen-based greedy algorithm can achieve the same or similar system capacity as the legacy ZF based greedy algorithm with lower computing complexity. The optimized BGD algorithm can be used for determining the minimum eigenvalue and its corresponding eigenvector, which has almost the same performance as the EVD based algorithm but has lower computing complexity. The optimized BGD algorithm is a RNN based algorithm, which can be implemented in different hardware (such as, CPU, DSP, GPU, FPGA and so on) easily. Further, the optimized BGD algorithm enables auto-calculated optimal learning rate, thereby achieving faster convergence.

In some example embodiments, an apparatus capable of performing the method 200 may comprise means for performing the respective steps of the method 200. The means may be implemented in any suitable form. For example, the means may be implemented in a circuitry or software module.

In some example embodiments, the apparatus capable of performing the method 200 (for example, the network device 120) comprises means for determining a set of candidate terminal devices; and means for iteratively performing the following at least once until an end condition is met: generating, based on respective channel estimations for the set of candidate terminal devices, a covariance matrix indicating interdependency among the set of candidate terminal devices; determining a minimum eigenvalue of the covariance matrix and an eigenvector corresponding to the minimum eigenvalue, the eigenvector indicating a set of measurements for interdependency among the set of candidate terminal devices; and updating the set of candidate terminal devices by removing, from the set of candidate terminal devices, a candidate terminal device associated with a maximum measurement in the set of measurements.

In some example embodiments, the end condition comprises at least one of the following: the number of the candidate terminal devices being below a first threshold number; the minimum eigenvalue meeting an exit criterion; and the number of iterations reaching a second threshold number.

In some example embodiments, the exit criterion is determined based on a coefficient for controlling the number of the candidate terminal devices, a trace of the covariance matrix and total power allocated to the candidate terminal devices.

In some example embodiments, the exit criterion is determined based on a coefficient for controlling the number of the candidate terminal devices, the number of the candidate terminal devices, a trace of the covariance matrix and total power allocated to the candidate terminal devices.

In some example embodiments, generating the covariance matrix comprises: generating a channel estimation matrix based on respective channel estimations for the set of candidate terminal devices, each row of the channel estimation matrix indicating a corresponding channel estimation for one of the set of candidate terminal devices; and generating the covariance matrix by multiplying the channel estimation matrix by conjugate transpose of the channel estimation matrix.

In some example embodiments, generating the covariance matrix comprises: generating a channel estimation matrix based on respective channel estimations for the set of candidate terminal devices, each column of the channel estimation matrix indicating a corresponding channel estimation for one of the set of candidate terminal devices; and generating the covariance matrix by multiplying conjugate transpose of the channel estimation matrix by the channel estimation matrix.

In some example embodiments, determining the minimum eigenvalue of the covariance matrix and the eigenvector corresponding to the minimum eigenvalue comprises: determining, based on a batch gradient descent algorithm, the minimum eigenvalue of the covariance matrix and the eigenvector corresponding to the minimum eigenvalue.

In some example embodiments, determining the eigenvector comprises initializing the eigenvector; and iteratively performing the following at least once until a convergence condition is met or the number of iterations reaches a third threshold number: generating a gradient vector based on the covariance matrix and the eigenvector; determining an optimal learning rate based on the gradient vector; adjusting the optimal learning rate based on a predetermined scaling rate; and updating the eigenvector based on the adjusted optimal learning rate and the gradient vector.

In some example embodiments, determining the minimum eigenvalue comprises: determining the minimum eigenvalue based on the covariance matrix and the eigenvector.

In some example embodiments, the apparatus capable of performing the method 200 (for example, the network device 120) further comprises means for scheduling the updated set of candidate terminal devices for uplink or downlink communications.

Figure 5:
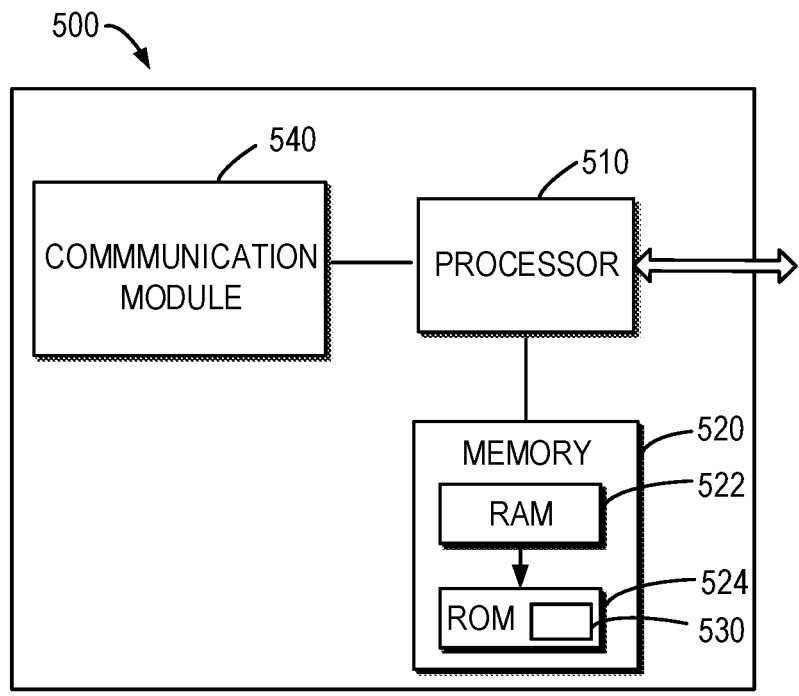
FIG. 5 illustrates a simplified block diagram of an apparatus that is suitable for implementing embodiments of the present disclosure.

FIG. 5 is a simplified block diagram of a device 500 that is suitable for implementing embodiments of the present disclosure. For example, the network device 120, and/or the terminal device 110 as shown in FIG. 1 can be implemented by the device 500. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIGS. 2-3. The embodiments of the present disclosure may also be implemented by hardware or by a combination of software and hardware.

Figure 6:
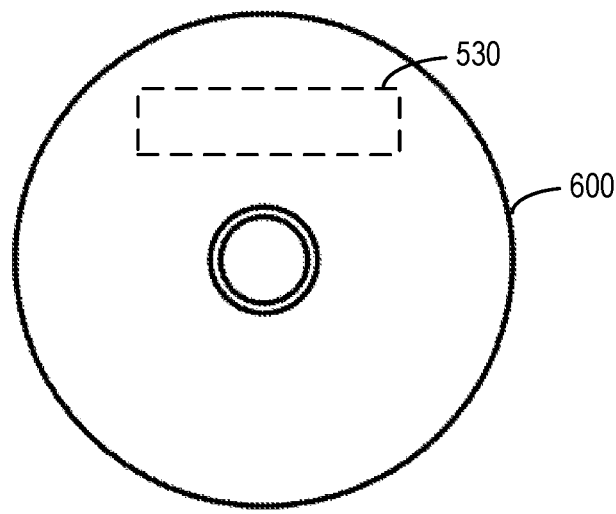
FIG. 6 illustrates a block diagram of an example computer readable medium in accordance with some example embodiments of the present disclosure.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 500 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 500 may be instead comprised in the distributed unit, and at least some of the described processes may be performed by the distributed unit.

In an embodiment, the execution of at least some of the functionalities of the apparatus 500 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 500 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2 and/or the method 300 as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
   at least one processor; and
   at least one memory including computer program code;
   the at least one memory and the computer program codes are configured to, with the at least one processor, cause the apparatus to:
      determine a set of candidate terminal devices; and
      iteratively perform the following at least once until an end condition is met:
         generating, based on respective channel estimations for the set of candidate terminal devices, a covariance matrix indicating interdependency among the set of candidate terminal devices;
         determining a minimum eigenvalue of the covariance matrix and an eigenvector corresponding to the minimum eigenvalue, the eigenvector indicating a set of measurements for interdependency among the set of candidate terminal devices; and
         updating the set of candidate terminal devices by removing, from the set of candidate terminal devices, a candidate terminal device associated with a maximum measurement in the set of measurements.

2. The apparatus of claim 1, wherein the end condition comprises at least one of the following:
   the number of the candidate terminal devices being below a first threshold number;
   the minimum eigenvalue meeting an exit criterion; and
   the number of iterations reaching a second threshold number.

3. The apparatus of claim 2, wherein the exit criterion is determined based on a coefficient for controlling the number of the candidate terminal devices, a trace of the covariance matrix and total power allocated to the candidate terminal devices.

4. The apparatus of claim 2, wherein the exit criterion is determined based on a coefficient for controlling the number of the candidate terminal devices, the number of the candidate terminal devices, a trace of the covariance matrix and total power allocated to the candidate terminal devices.

5. The apparatus of claim 1, wherein the at least one memory and the computer program code are configured to, with the at least one processor, cause the apparatus to generate the covariance matrix by:
    generating a channel estimation matrix based on respective channel estimations for the set of candidate terminal devices, each row of the channel estimation matrix indicating a corresponding channel estimation for one of the set of candidate terminal devices; and
    generating the covariance matrix by multiplying the channel estimation matrix by conjugate transpose of the channel estimation matrix.

6. The apparatus of claim 1, wherein the at least one memory and the computer program code are configured to, with the at least one processor, cause the apparatus to determine the minimum eigenvalue of the covariance matrix and the eigenvector corresponding to the minimum eigenvalue by:
    determining, based on a batch gradient descent algorithm, the minimum eigenvalue of the covariance matrix and the eigenvector corresponding to the minimum eigenvalue.

7. The apparatus of claim 1, wherein the at least one memory and the computer program code are configured to, with the at least one processor, cause the apparatus to determine the eigenvector by:
    initializing the eigenvector; and
    iteratively performing the following at least once until a convergence condition is met or the number of iterations reaches a third threshold number:
        generating a gradient vector based on the covariance matrix and the eigenvector;
        determining an optimal learning rate based on the gradient vector;
        adjusting the optimal learning rate based on a predetermined scaling rate; and
        updating the eigenvector based on the adjusted optimal learning rate and the gradient vector.

8. The apparatus of claim 7, wherein the at least one memory and the computer program code are configured to, with the at least one processor, cause the apparatus to determine the minimum eigenvalue by:
    determining the minimum eigenvalue based on the covariance matrix and the eigenvector.

9. The apparatus of claim 1, wherein the at least one memory and the computer program code are further configured to, with the at least one processor, cause the apparatus to:
    schedule the updated set of candidate terminal devices for uplink or downlink communications.

10. A method, comprising:
    determining a set of candidate terminal devices; and
    iteratively performing the following at least once until an end condition is met:
        generating, based on respective channel estimations for the set of candidate terminal devices, a covariance matrix indicating interdependency among the set of candidate terminal devices;
        determining a minimum eigenvalue of the covariance matrix and an eigenvector corresponding to the minimum eigenvalue, the eigenvector indicating a set of measurements for interdependency among the set of candidate terminal devices; and
        updating the set of candidate terminal devices by removing, from the set of candidate terminal devices, a candidate terminal device associated with a maximum measurement in the set of measurements.

11. The method of claim 10, wherein the end condition comprises at least one of the following:
    the number of the candidate terminal devices being below a first threshold number;
    the minimum eigenvalue meeting an exit criterion; and
    the number of iterations reaching a second threshold number.

12. The method of claim 11, wherein the exit criterion is determined based on a coefficient for controlling the number of the candidate terminal devices, a trace of the covariance matrix and total power allocated to the candidate terminal devices.

13. The method of claim 11, wherein the exit criterion is determined based on a coefficient for controlling the number of the candidate terminal devices, the number of the candidate terminal devices, a trace of the covariance matrix and total power allocated to the candidate terminal devices.

14. The method of claim 10, wherein generating the covariance matrix comprises:
    generating a channel estimation matrix based on respective channel estimations for the set of candidate terminal devices, each row of the channel estimation matrix indicating a corresponding channel estimation for one of the set of candidate terminal devices; and
    generating the covariance matrix by multiplying the channel estimation matrix by conjugate transpose of the channel estimation matrix.

15. The method of claim 10, wherein determining the minimum eigenvalue of the covariance matrix and the eigenvector corresponding to the minimum eigenvalue comprises:
    determining, based on a batch gradient descent algorithm, the minimum eigenvalue of the covariance matrix and the eigenvector corresponding to the minimum eigenvalue.

16. The method of claim 10, wherein determining the eigenvector comprises:
    initializing the eigenvector; and
    iteratively performing the following at least once until a convergence condition is met or the number of iterations reaches a third threshold number:
        generating a gradient vector based on the covariance matrix and the eigenvector;
        determining an optimal learning rate based on the gradient vector;
        adjusting the optimal learning rate based on a predetermined scaling rate; and
        updating the eigenvector based on the adjusted optimal learning rate and the gradient vector.

17. The method of claim 16, wherein determining the minimum eigenvalue comprises:
    determining the minimum eigenvalue based on the covariance matrix and the eigenvector.

18. The method of claim 10, further comprising:
    scheduling the updated set of candidate terminal devices for uplink or downlink communications.

19. A computer program embodied on a non-transitory computer readable storage medium, said computer program comprising program instructions stored thereon, the instructions, when executed by an apparatus, causing the apparatus to:
- determine a set of candidate terminal devices; and
- iteratively perform the following at least once until an end condition is met:
  - generating, based on respective channel estimations for the set of candidate terminal devices, a covariance matrix indicating interdependency among the set of candidate terminal devices;
  - determining a minimum eigenvalue of the covariance matrix and an eigenvector corresponding to the minimum eigenvalue, the eigenvector indicating a set of measurements for interdependency among the set of candidate terminal devices; and
- updating the set of candidate terminal devices by removing, from the set of candidate terminal devices, a candidate terminal device associated with a maximum measurement in the set of measurements.

\* \* \* \* \*